United States Patent [19]

Vicenes

[11] Patent Number: 4,879,838

[45] Date of Patent: Nov. 14, 1989

[54] KNOCK-DOWN TOPIARY FORM

[75] Inventor: Rudy Vicenes, Cliffside Park, N.J.

[73] Assignee: Speath Design, New York, N.Y.

[21] Appl. No.: 98,854

[22] Filed: Sep. 21, 1987

Related U.S. Application Data

[63] Continuation-in-part of Ser. No. 30,546, Mar. 26, 1987.

[51] Int. Cl.[4] .............................................. A01G 17/04
[52] U.S. Cl. .............................................. 47/45; 47/4; 47/47; 446/97; D11/149
[58] Field of Search ................... 47/47, 41.12, 45, 46, 47/4; D11/149, 117, 118; D21/155; 446/97, 99

[56] References Cited

U.S. PATENT DOCUMENTS

| D. 254,056 | 1/1980 | Bales | D11/149 |
|---|---|---|---|
| 915,146 | 3/1909 | Woerner | 47/47 |
| 1,895,282 | 1/1933 | Fisher | 47/4 |
| 3,033,505 | 5/1962 | Brown | 248/175 |
| 3,692,617 | 9/1972 | Marks et al. | 428/20 |
| 3,992,812 | 11/1976 | Horowitz | 47/45 |
| 4,190,984 | 3/1980 | Pierce | 47/4 X |
| 4,196,542 | 4/1980 | West | 47/4 |

OTHER PUBLICATIONS

West Topiary Price List, 47/4, 1977.

Primary Examiner—Robert A. Hafer
Assistant Examiner—Kevin G. Rooney
Attorney, Agent, or Firm—Parmelee, Bollinger & Bramblett

[57] ABSTRACT

Easily assembled and disassembled topiary forms for defining the three-dimensional body-shape of a predetermined object. The topiary forms are readily assembled or disassembled for easy transport or mailing.

17 Claims, 5 Drawing Sheets

KNOCK-DOWN TOPIARY FORM

RELATED APPLICATION

This application is a continuation-in-part of design patent application Ser. No. 030,546, filed March 26, 1987.

FIELD OF THE INVENTION

This invention relates to topiary forms that are readily disassembled or knocked-down for transport or mailing.

BACKGROUND OF THE INVENTION

Topiary art or gardening is a very ancient practice or art of training plants by patient development to grow in assorted and varied architectural, sculptural, geometric and animal shapes or the like by a combination of horticultural techniques including bending, cutting, clipping, pruning and shearing of plants. This highly rewarding and visually attractive garden art form has for the most part been practiced in boxwoods, yews, privet hedges and to a lesser extent on juniper, arbor-vitae and rosemary for miniature works.

Topiary art has been practiced since the Egyptian, Greek and Roman Empires. Although topiary art receded after the Roman Empire, it again became a fashionable gardening endeavor in the 16th, 17th and 18th Centuries and became an essential feature throughout Europe, especially in Italian gardens and in the Netherlands. With the ascension of William and Mary of Orange to the English throne in 1689, topiary art became a main feature of English gardens for about the next two hundred years. Although many examples of this fine art remain throughout England, Levens Hall, in Westmorland, and Hampton Court, the royal palace on the Thames in London, stand as remarkable examples of this art.

In the United States topiary art was brought to the colonies by the English and examples of the art are found in the formal gardens in Colonial Williamsburg. The height of topiary art in America was probably the estate gardens of Hollis H. Hammerwell in Wellesley, Massachusetts, although many adherents to the art were found in the South and also in California. The art has unfortunately, however, once again suffered a decline in the late 19th and 20th Centuries.

Although the art has been practiced over the centuries by gardeners working free-hand without any forms, the art has also involved the preparation of elaborate forms to be used to give form and substance to the shape desired for a plant being trained. Thus, practice of the topiary art has involved not only the skills of highly trained gardeners but of metal workers to plan and construct these necessary forms.

Decline of the practice of topiary art has been caused not only because of the rarity of gardeners skillfully trained as topiarists but also because of the lack of essentially skilled metal workers to plan and construct the necessary wire forms for the topiarist. Moreover, the forms are generally of bulky construction in order to produce pleasing, attractive and intricate designs and therefore not readily or easily transported from one place to another. Thus, a sufficiently skilled metal worker would be required at each location this art is practiced in order to produce the necessary forms for the topiarist. It will be appreciated that to employ both a topiarist as well as a metal worker at each site is quite expensive and this impracticality has in part contributed to the decline in the practice of this pleasing art form.

Many who would like to practice or learn this art form find it economically impractical to have on their house staff a metal worker to produce forms for practice of the art. It would, therefore, be highly desirable if those who wished to practice or learn the art could have ready access to topiary forms. However, because of the size and construction of such forms, it has been generally economically impractical to transport such forms from one location to another. By their very nature the forms are required to be mostly open yet sufficiently rigid to support and train the plants to the desired shape. Thus, the forms generally have been shaped-forms of heavy gauge wire permanently welded or held together to provide sufficient structural integrity. Therefore, it has not heretofore been practical for a supplier in one location to produce and build topiary forms for use at another remote location or for such topiary forms to be easily and cheaply transported, such as by mail or similar delivery services, to intended users at remote locations.

It is therefore highly desirable that topiary forms be available that although of sufficient structural strength and rigidity for use in topiary art, can be readily and easily knocked-down or disassembled and cheaply shipped or transported. It is also most desirable that such topiary forms be available which are easily assembled or constructed on site without the need for experience or cumbersome equipment and which can be readily assembled by the intended user without requiring an inordinate amount of talent or skill.

BRIEF DESCRIPTION OF THE DRAWINGS

The invention will be described in reference to the following drawing in which.

BRIEF SUMMARY OF THE INVENTION

The invention comprises a knock-down topiary form that is readily assembled for defining a three-dimensional body-shape and disassembled by persons without requiring special skills or abilities and which is adapted for compact storage and shipment.

Figure 1:
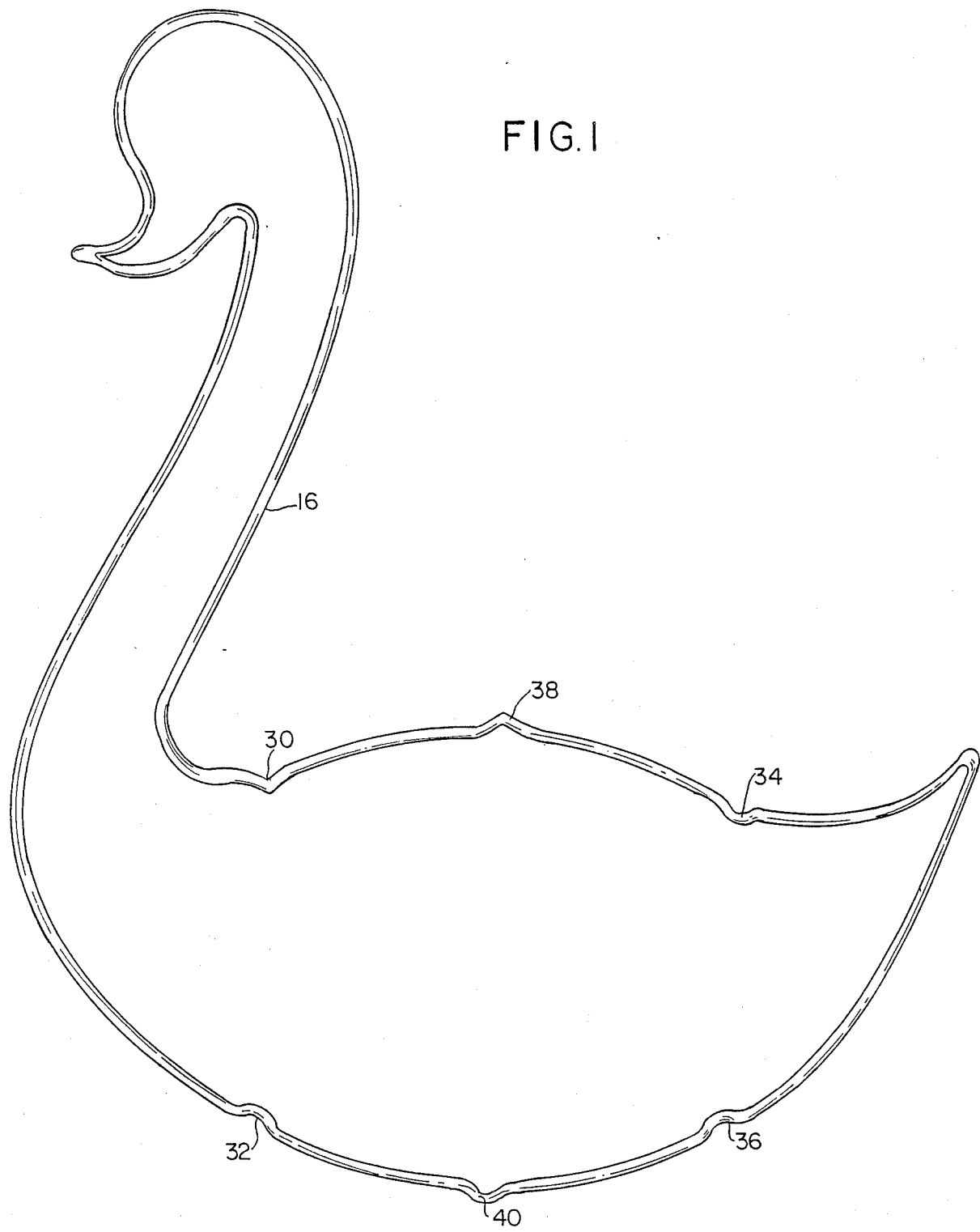
FIG. 1 is an elevational view of a first body-outline member of the invention.
Figure 2:
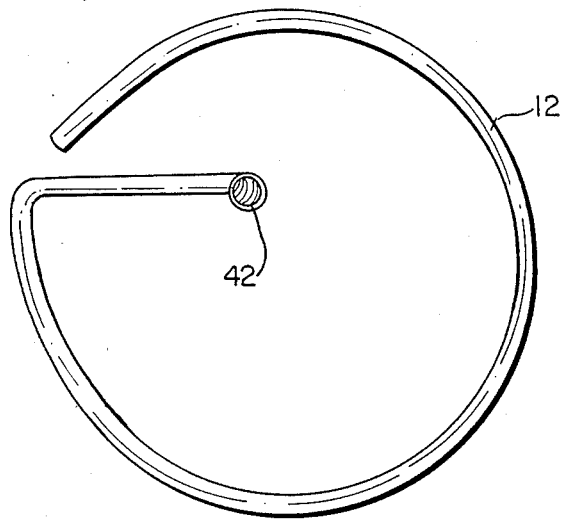
FIG. 2 is a top plan view of a support base member of the invention.
Figure 3:
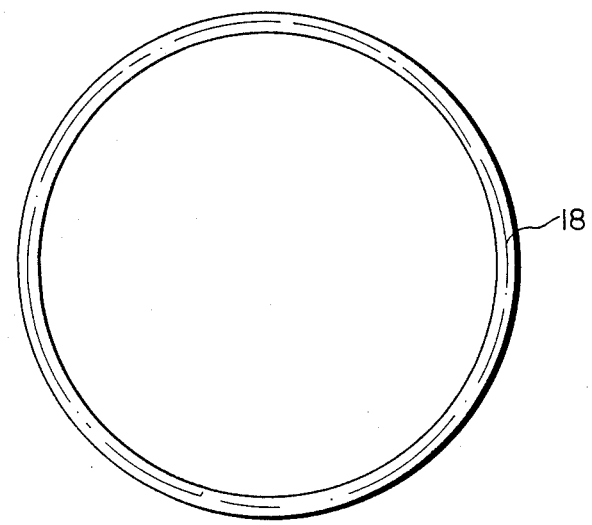
FIGS. 3 and 4 are elevational views of second and third body-outline members of the invention.
Figure 4:
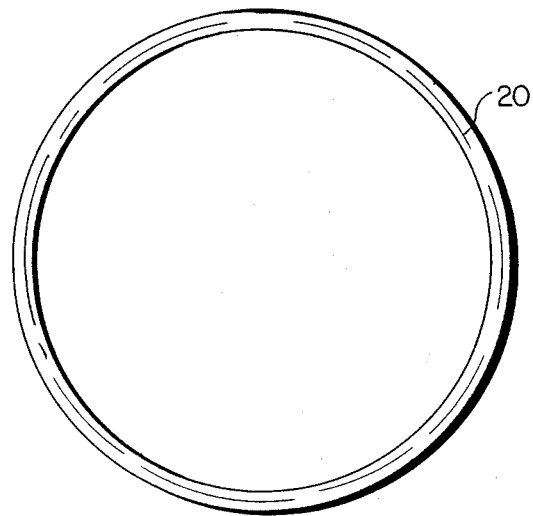
Figure 7:
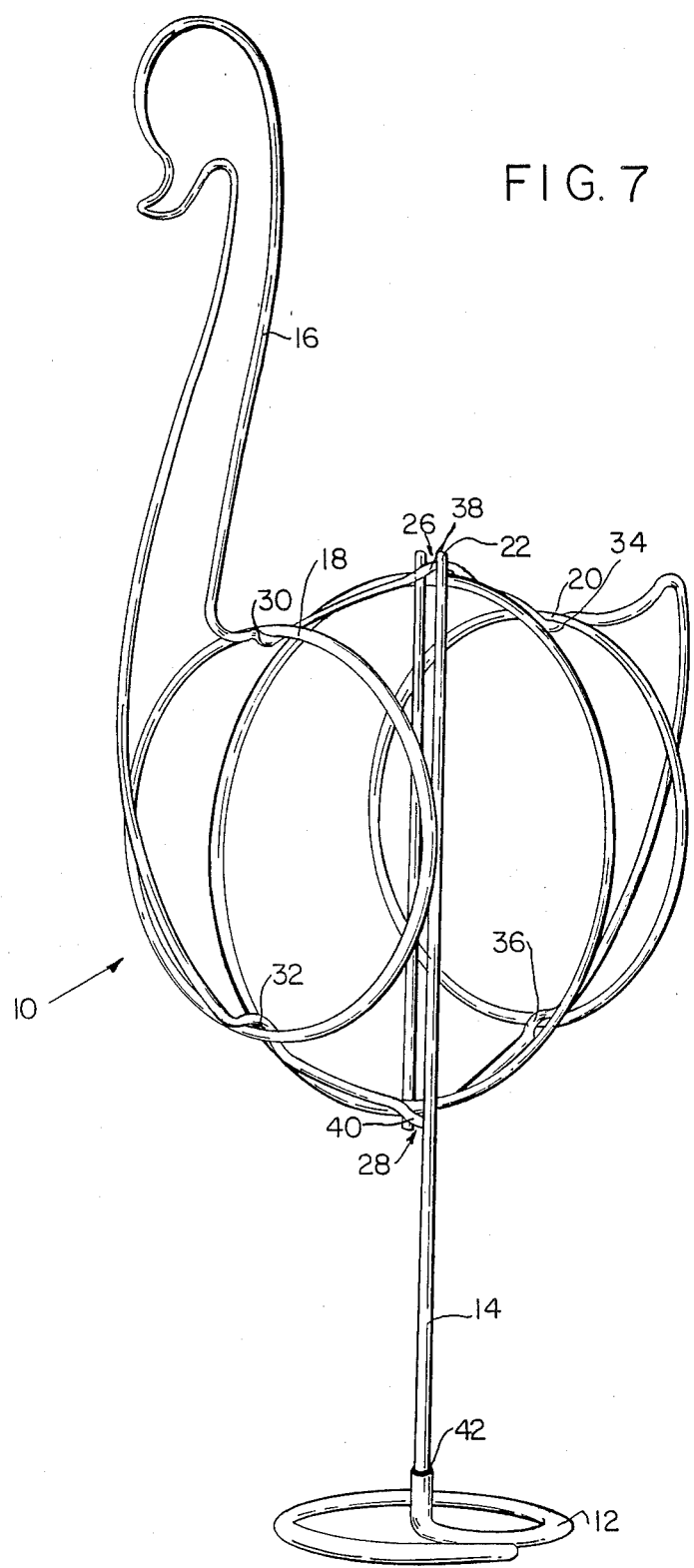
FIG. 7 is a perspective view of the fully assembled knock-down topiary form.

An illustrative readily assembled knock-down topiary form 10 in the shape of a duck is illustrated in its fully assembled form in FIG. 7. The topiary form 10 illustrated is assembled from a base support member 12, shown in FIG. 2, a vertically upstanding support member 14 shown in FIG. 5, a first body-outline member 16 shown in FIG. 1, a second body-outline member 18 shown in FIG. 3 and a third body-outline member 20 shown in FIG. 4 and as described hereinafter. Although for purposes of illustration the invention is exemplified by a knock-down topiary form in the shape of a duck, it will be appreciated that the form can be the shape of any suitable predetermined object, animate or inanimate. It is preferred, however, that the topiary form is in the general shape of a living creature, such as for example, a duck, swan, bear, eagle, donkey or the like. However, inanimate objects such as globes, cylinders and box shapes or other suitable geometric shapes may be the object formed by the topiary form.

A first body-outline member 16 (FIG. 1) has the shape of the perimeter of a longitudinal central plane section taken along the longitudinal central plane of the predetermined object.

The second body-outline member 18 (FIG. 3) has generally the shape of the perimeter of a forebody transverse plane section taken through a forebody portion of the predetermined object perpendicular to the longitudinal central plane of the predetermined object.

The third body-outline member 20 (FIG. 4) has generally the shape of the perimeter of a rearbody transverse plane section taken through a rearbody portion of the predetermined object perpendicular to the longitudinal central plane of the predetermined object.

Figure 5:
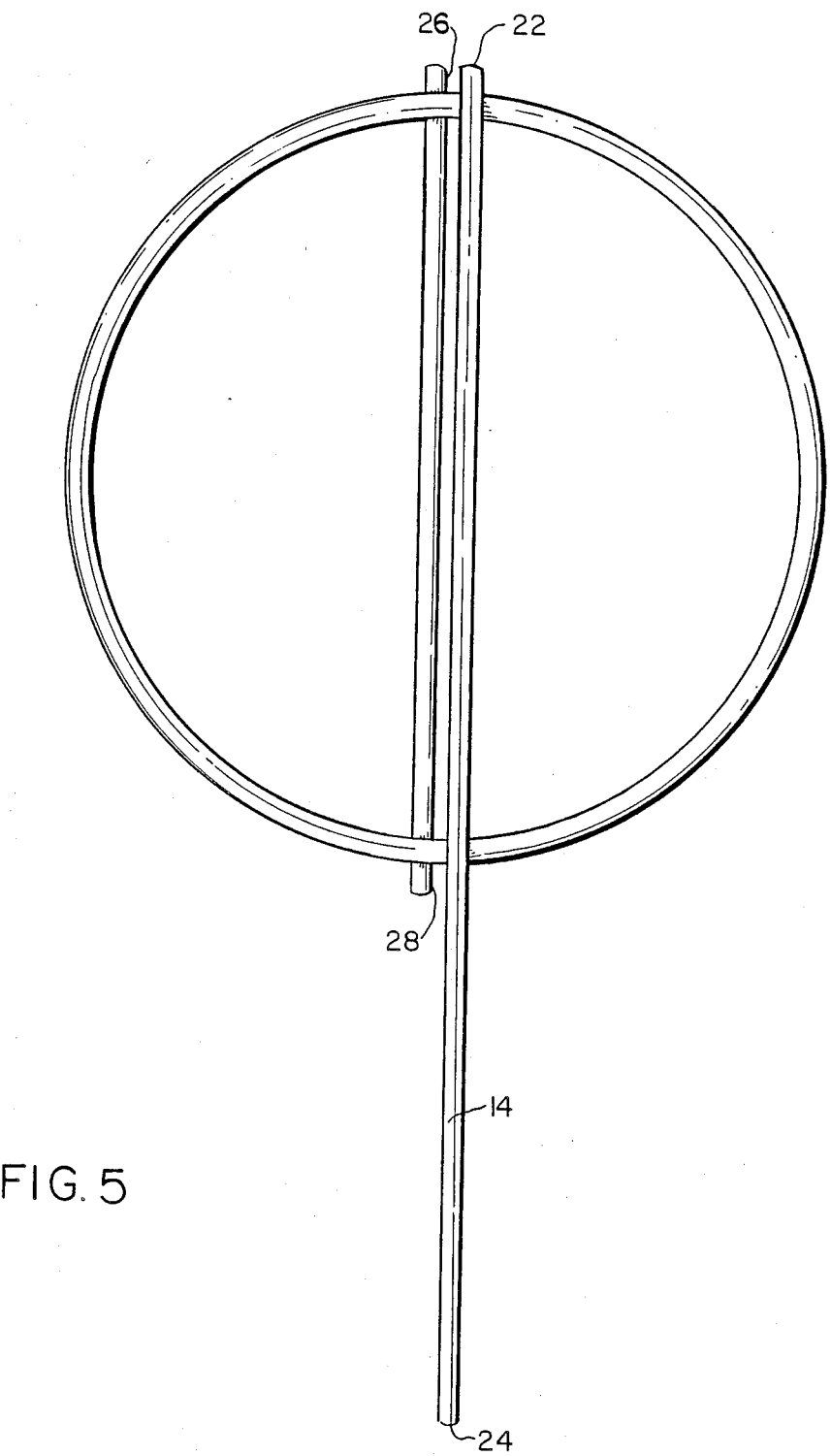
FIG. 5 is an elevational view of a vertical support member of the invention.

A vertically upstanding support member 14 is illustrated in FIG. 5 and has generally the shape of the perimeter of a midbody transverse plane section taken through the midbody portion of the predetermined object perpendicular to the longitudinal central plane of the predetermined object and thus forms a fourth-body outline member. Upstanding support member 14 has an upper end 22 and a lower end 24. Body-outline member receiving means 26 and 28 are provided at the upper end 22 and at a position intermediate the upper and lower end 22 and 24 of the support member. The receiving means 26 and 28 are generally oppositely, outwardly facing grooves for receiving the first body-outline member 16 and holding said first body-outline member 16 in place by tension on said first body-outline member. It will be appreciated that the grooves 26 and 28 could be opposed inwardly facing grooves to hold the first body-outline member 16 by compression on the member.

First body-outline member 16 is provided with a first pair of opposed saddles 30 and 32 located at two respective positions corresponding to the two positions where the perimeter of the forebody transverse plane section providing the shape of the second body-outline member 18 intersects with the perimeter of the longitudinal central plane section providing the shape of the first body-outline member 16. First body-outline member 16 is also provided with a second set of opposed saddles 34 and 36 located at the two respective positions corresponding to the two positions where the perimeter of the rearbody transverse plane section providing the shape of the third body-outline member 20 intersects with the perimeter of the longitudinal central plane section providing the shape of the first body-outline member 16.

The first pair of saddle 30 and 32 are for removably receiving therein the second body-outline member 18 whereby the plane of the second body-outline member 18 is held substantially perpendicular to the plane of the first body-outline member 16. The second pair of saddles 34 and 36 are for removably receiving therein the third body-outline member 20 whereby the plane of the third body-outline member 20 is held substantially perpendicular to the plane of the first body-outline member.

Figure 6:
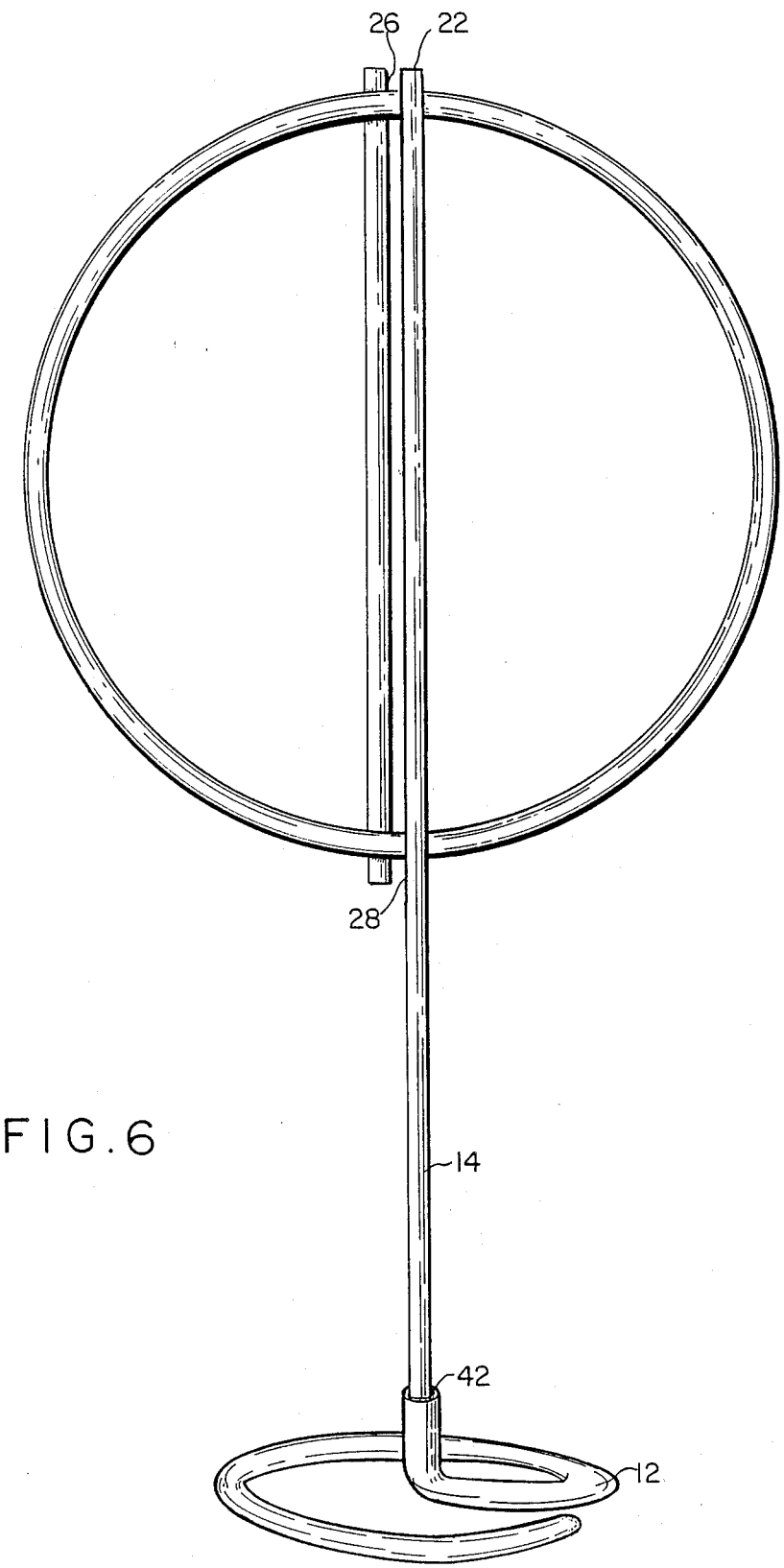
FIG. 6 is a perspective view of the vertical support member of FIG. 5 removably mounted in the support base member of FIG. 2.

If desired, a third pair of opposed saddles 38 and 40 are located on the first body-outline member 16 at two respective positions corresponding to the two positions where the perimeter of the midbody transverse plane section of the vertically upstanding support member 14 intersects with the perimeter of the longitudinal central plane section providing the shape of the first body-outline member 16, said third pair of saddles 38 and 40 are located on the first body-outline member intermediate the first and second pair of saddles 30 and 32 and 34 and 36 respectively. The third pair of saddles 38 and 40 may be employed to removably hold the first body-outline member 16 in opposed grooves 26 and 28 of vertical support member 14 such that the first body-outline member 16 is substantially perpendicular to the plane of the midbody transverse plane section forming the general shape of the vertical upstanding support member 14.

Where it is desired, a base support member 12 (FIG. 2) may be provided for supporting the assembled topiary form upright corresponding to a typical upright position of the predetermined object. That base support member 12 may be in any suitable substantially horizontal or flat shape and is provided with receiving means 42 for removably inserting lower end 24 of vertically upstanding support member 14 therein, as shown in FIGS. 6 and 7, for supporting the assembled topiary form 10 in an upright position corresponding to the typical upright position of the predetermined object. Base support 12 is preferably a hollow tubular form terminating in an open, hollow upstanding socket 42 for receiving the lower end 24 of the vertically upstanding support member 14.

In the preferred form illustrated, the saddles of at least one pair of saddles, most preferably saddles 38 and 40, are each concave in an outward direction with respect to first body-outline member 16 and the saddles of at least one other pair and most preferably both other pairs, 30 and 32 and 34 and 36, are each concave in an inward direction with respect to the first body-outline member 16. In this preferred form the assembled topiary form 10 is held in substantially rigid form for use by a combination of tensional and compressional forces on first body-outline member 16 by members 14, 18 and 20.

The body-outline members 16, 18 and 20 comprise substantially flat, wire, shaped-forms that are easily and readily constructed from any suitable heavy gauge stiffly flexible wire.

The assembled topiary form 10 may be assembled in a variety of steps and do not require any one set procedure. As an example, the illustrated form may be assembled in the following manner. Vertically upstanding support member 14 is removably mounted in base support member 12 by placing its lower end 24 in receiving socket member 42 as illustrated in FIG. 6. First body-outline member 16 is removably placed on vertically upstanding support member 14 by placing saddles 38 and 40 in grooves 26 and 28 so that the first body-outline member 16 is held in place by tensional forces. Thereafter second and third body-outline members 18 and 20 respectively are slipped over the forward and rearward portions, respectively, of the first body-outline member 16 and removably placed in saddle pairs 30 and 32 and 34 and 36, respectively, so as to create compressional forces on the saddle pairs. Thus, the assembled topiary form is held in a relatively rigid, stable assembled form for use by the combined compressional and tensional forces created by the assembled members.

When it is desired to disassemble the topiary form 10 it is merely a matter of removing the assembled members in a similar but reverse procedure. The body-outline members are constructed so as to be stiffly flexible but substantially rigid elements that may be flexed sufficiently to be removably assembled in and removed from the saddles and grooves as described hereinbefore.

I claim:

1. A knock-down topiary form capable of being conveniently assembled for usage for defining a three-dimensional body-shape of a predetermined object and readily disassembled for compact shipment and storage, said knock-down topiary form comprising:

a vertically upstanding support member having upper and lower ends, the vertically upstanding support member having generally the shape of a body outline of the predetermined object formed by the perimeter of a midbody traverse plane section taken through the midbody portion of the predetermined object perpendicular to a longitudinal central plane formed by the body outline of said predetermined object, and having body-outline member receiving means at its upper end and at a position intermediate its upper and lower ends for engaging in a releasable manner another body-outline member, at least three body-outline members, said body-outline members each comprising a stiffly flexible, substantially flat element lying in a plane and each having a shape corresponding generally to the shape of a body outline of the predetermined object formed by the perimeter of a different predetermined plane section taken through the predetermined object, a first of said body-outline members having generally the shape of a body outline of the predetermined object formed by the perimeter of a longitudinal central plane section taken along the longitudinal central plane of said predetermined object, a second of said body-outline members having generally the shape of a body outline of the predetermined object formed by the perimeter of a forebody transverse plane section taken through a forebody portion of said predetermined object perpendicular to said longitudinal central plane of said predetermined object, a third of said body-outline members having generally the shape of a body outline of the predetermined object formed by the perimeter of a rearbody transverse plane section taken through a rearbody portion of said predetermined object perpendicular to said longitudinal central plane of said predetermined object, said first body-outline member having a first pair of opposed saddles located at two respective positions corresponding to the two positions where the body outline formed by the perimeter of said forebody transverse plane section intersects with the body outline formed by the perimeter of said longitudinal central plane section of said predetermined object, said first body-outline member also having a second pair of opposed saddles located at two respective positions corresponding to the two positions where the body outline formed by the perimeter of said rearbody transverse plane section intersects with the body outline formed by the perimeter of said longitudinal central plane section of said predetermined object, said first body-outline member being removably mountable in the body-outline member receiving means of said vertically upstanding support member, said second body-outline member being removably mountable in said first pair of saddles with the plane of said second body-outline member being substantially perpendicular to the plane of said first body-outline member, said third body-outline member being removably mountable in said second pair of saddles with the plane of said third body-outline member being substantially perpendicular to the plane of said first body-outline member, and whereby said knock-down topiary form, being assembled by removably mounting said first body-outline member in said body-outline member receiving means on said vertically upstanding support member, removably mounting said second body-outline member in said first pair of saddles and by removably mounting said third body-outline member in said second pair of saddles with the respective planes of said vertically upstanding support member and said second and third body-outline members being substantially perpendicular to the plane of said first body-outline member, the assembled topiary form defining the three-dimensional shape of the predetermined object.

2. The knock-down topiary form as claimed in claim 1, in which:

the saddles of at least one of said first and second pairs of saddles are each concave in an outward direction with respect to said first body-outline member.

3. The knock-down topiary form as claimed in claim 1, in which:

the saddles of at least one pair of said pairs of saddles are each concave in an outward direction with respect to said first body-outline member, and the saddles of another pair of said pairs of saddles are each concave in an inward direction with respect to said first body-outline member.

4. The knock-down topiary form as claimed in claim 1 in which the predetermined object has the shape of a living creature.

5. The knock-down topiary form as claimed in claim 3 in which the predetermined object has the shape of a living creature.

6. The knock-down topiary form as claimed in claim 3 in which the body-outline members comprise substantially flat, shaped wire forms.

7. The knock-down topiary form as claimed in claim 4 in which the body-outline members comprise substantially flat, shaped wire forms.

8. A knock-down topiary form for use in training a plant to a desired shape of a body of a predetermined object and capable of being conveniently assembled for usage for defining the three-dimensional body-shape of the predetermined object and readily disassembled for compact shipment and storage, said knock-down topiary form comprising:

a support base, a vertically upstanding support member having upper and lower ends, the vertically upstanding support member having generally the shape of a body outline of the predetermined object formed by the perimeter of a midbody traverse plane section taken through the midbody portion of the predetermined object perpendicular to a longitudinal central plane formed by the body outline of said predetermined object, being releasably attached at its lower end to the support base and having body-outline member receiving means at its upper end and at a position intermediate its upper and lower ends for engaging in a releasable manner another body-outline member, at least three body-outline members, said body-outline members each comprising a stiffly flexible, substantially flat element lying in a plane and each having a shape corresponding generally to the shape of a body outline of the predetermined object formed by the perimeter of a different predetermined plane section taken through the predetermined object, a first of said body-outline members having generally the shape of a body outline of the predetermined object formed by the perimeter of a longitudinal central plane section taken along the longitudinal central plane of said predetermined object, a second of said body-outline members having generally the shape of a body outline of the predetermined object formed by the perimeter of a forebody transverse plane section taken through a forebody portion of said predetermined object perpendicular to said longitudinal central plane of said predetermined object, a third of said body-outline members having generally the shape of a body outline of the predetermined object formed by the perimeter of a rearbody transverse plane section taken through a rearbody portion of said predetermined object perpendicular to said longitudinal central plane of said predetermined object, said first body-outline member having a first pair of opposed saddles located at two respective positions corresponding to the two positions where the body outline formed by the perimeter of said forebody transverse plane section intersects with the body outline formed by the perimeter of said longitudinal central plane section of said predetermined object, said first body-outline member also having a second pair of opposed saddles located at two respective positions corresponding to the two positions where the body outline formed by the perimeter of said rearbody transverse plane section intersects with the body outline formed by the perimeter of said longitudinal central plane section of said predetermined object, said first body-outline member being removably mountable in the body-outline member receiving means of said vertically upstanding support member, said second body-outline member being removably mountable in said first pair of saddles with the plane of said second body-outline member being substantially perpendicular to the plane of said first body-outline member, said third body-outline member being removably mountable in said second pair of saddles with the plane of said third body-outline member being substantially perpendicular to the plane of said first body-outline member, and whereby said knock-down topiary form, being assembled by removably mounting said first body-outline member in said body-outline member receiving means on said vertically upstanding support member, removably mounting said second body-outline member in said first pair of saddles and by removably mounting said third body-outline member in said second pair of saddles with the respective planes of said vertically upstanding support member and said second and third body-outline members being substantially perpendicular to the plane of said first body-outline member, the assembled topiary form defines the three-dimensional shape of the predetermined object.

9. The knock-down topiary form as claimed in claim 8, in which:

said first body-outline member has a third pair of opposed saddles located at two respective positions corresponding to the two positions where the body outline formed by the perimeter of said midbody transverse plane section intersects with the perimeter of said longitudinal central plane section of said predetermined object, said third pair of saddles being located on said first body-outline member intermediate said first and second pairs of saddles, said vertically upstanding support member is removably mountable in said third pair of saddles with the plane of said vertically upstanding support member being perpendicular to the plane of said first body-outline member.

10. The knock-down topiary form as claimed in claim 9, in which:

the saddles of at least one of said pairs of saddles are each concave in an outward direction with respect to said first body-outline member.

11. The knock-down topiary form as claimed in claim 9, in which:

the saddles of at least one pair of said pairs of saddles are each concave in an outward direction with respect to said first body-outline member, and the saddles of another pair of said pairs of saddles are each concave in an inward direction with respect to said first body-outline member.

12. The knock-down topiary form as claimed in claim 11, in which the predetermined object has the shape of a living creature.

13. The knock-down topiary form as claimed in claim 9, in which the predetermined object has the shape of a living creature.

14. The knock-down topiary form as claimed in claim 11, in which the predetermined object has the shape of a living creature.

15. The knock-down topiary form as claimed in claim 12 in which the body-outline members comprise substantially flat, shaped wire forms.

16. The knock-down topiary form as claimed in claim 13 in which the body-outline members comprise substantially flat, shaped wire forms.

17. The knock-down topiary form as claimed in claim 14 in which the body-outline members comprise substantially flat, shaped wire forms.

* * * * *